US009210335B2

(12) United States Patent
Bienvenu

(10) Patent No.: US 9,210,335 B2
(45) Date of Patent: Dec. 8, 2015

(54) METHOD FOR GENERATING HDR IMAGES USING MODIFIED WEIGHT

(71) Applicant: KONICA MINOLTA LABORATORY U.S.A., INC., San Mateo, CA (US)

(72) Inventor: Alexis Bienvenu, Mere (FR)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 80 days.

(21) Appl. No.: 14/219,013

(22) Filed: Mar. 19, 2014

(65) Prior Publication Data

US 2015/0271383 A1    Sep. 24, 2015

(51) Int. Cl.
| G06K 9/00 | (2006.01) |
| H04N 5/235 | (2006.01) |
| G06T 5/00 | (2006.01) |
| G06T 5/50 | (2006.01) |
| H04N 5/265 | (2006.01) |

(52) U.S. Cl.
CPC .............. *H04N 5/2355* (2013.01); *G06T 5/002* (2013.01); *G06T 5/006* (2013.01); *G06T 5/009* (2013.01); *G06T 5/50* (2013.01); *H04N 5/2353* (2013.01); *H04N 5/2356* (2013.01); *H04N 5/265* (2013.01); *G06T 2207/10144* (2013.01); *G06T 2207/20008* (2013.01); *G06T 2207/20208* (2013.01)

(58) Field of Classification Search
None
See application file for complete search history.

(56) References Cited

U.S. PATENT DOCUMENTS

| 8,345,975 | B2 * | 1/2013 | Wang et al. | 382/173 |
| 2007/0216905 | A1 * | 9/2007 | Han et al. | 356/446 |
| 2010/0215265 | A1 * | 8/2010 | Tseng et al. | 382/167 |
| 2010/0271512 | A1 * | 10/2010 | Garten | 348/239 |
| 2011/0211732 | A1 * | 9/2011 | Rapaport | 382/107 |
| 2011/0254976 | A1 * | 10/2011 | Garten | 348/229.1 |
| 2011/0310970 | A1 * | 12/2011 | Lee et al. | 375/240.16 |
| 2012/0141029 | A1 * | 6/2012 | Cha et al. | 382/171 |
| 2012/0288217 | A1 * | 11/2012 | Zhai et al. | 382/294 |

(Continued)

OTHER PUBLICATIONS

Neve et al., "An Improved HDR Image Synthesis Algorithm", IEEE 16th Int. Conf. Image Processing (ICIP2009), Cairo, Egypt, Nov. 7-10, 2009, pp. 1545-1548.*

(Continued)

*Primary Examiner* — Bhavesh Mehta
*Assistant Examiner* — Feng Niu
(74) *Attorney, Agent, or Firm* — Chen Yoshimura LLP

(57) ABSTRACT

An improved method for generating high dynamic range images by modifying the weight function used in conventional methods to weigh pixel values when combining multiple images in an input image set. Different weight functions, as functions of intensity, are used for different images (brackets). For darker brackets, a region near the high end of the intensity range is given higher weight values than a symmetrical region near the lower end of the intensity range; for brighter brackets, a region near the lower end of the intensity range is given higher weight values than a symmetrical region near the higher end of the intensity range. The weight function for the middle brackets are kept symmetrical but its function is non-zero at the two end points of the intensity range. This is effective for reducing chromatic artifacts for under- or over-exposed areas, in particular when ghost artifact removal is incorporated.

13 Claims, 2 Drawing Sheets

Weight functions for HDR image generation (A) for a darker bracket (B) for a brighter bracket

(56) References Cited

U.S. PATENT DOCUMENTS

| | | | |
|---|---|---|---|
| 2013/0028509 A1* | 1/2013 | Moon et al. | 382/162 |
| 2014/0079333 A1* | 3/2014 | Hirai et al. | 382/255 |
| 2014/0307044 A1* | 10/2014 | Sharma et al. | 348/36 |
| 2015/0002689 A1* | 1/2015 | Weissman et al. | 348/222.1 |

OTHER PUBLICATIONS

Heo et al., "Ghost-Free High Dynamic Range Imaging", R. Kimmel, R. Klette, and A. Sugimoto (Eds.): ACCV 2010, Part IV, LNCS 6495, pp. 486-500, 2011.*

Debevec et al. "Recovering High Dynamic Range Radiance Maps from Photographs", SIGGRAPH 97, Aug. 1997.

* cited by examiner

Weight functions for HDR image generation (A) for a darker bracket (B) for a brighter bracket

METHOD FOR GENERATING HDR IMAGES USING MODIFIED WEIGHT

BACKGROUND OF THE INVENTION

1. Field of the Invention

This invention relates to high dynamic range (HDR) imaging, and in particular, it relates to such a method employing modified weight functions.

2. Description of Related Art

High dynamic range (HDR) imaging is a technique used in image processing and digital photography to handle sources that have extremely large ranges of brightness (light intensity). For example, an outdoor scene in daylight may include blue sky and sunlit objects as well as objects in shadows; a night scene may include neon lights and brightly lit objects as well as poorly lit objects; an indoor scene may include bright windows as well as darker areas, etc. These scenes pose a challenge for imaging devices such as digital cameras; the dynamic range of the image sensor of currently available digital cameras often cannot adequately image such scenes. If the exposure level is adequate for capturing details of darker areas of the scene, the brighter areas will often be overexposed with details lost; conversely, if the exposure level is adequate for capturing details of brighter areas of the scene, the darker areas will often be underexposed with details lost.

HDR imaging techniques deal with this problem by taking multiple images of the same scene at various exposure levels, and then digitally merging the multiple images to create an HDR image that contains information from the original multiple images, so that details in both brighter and darker areas are adequately expressed in the HDR image.

Bracketing is a technique in photography for taking multiple images of the same scene using different exposure levels or other different setting values such as focus, depth of field, etc. Some cameras can perform autobracketing, i.e., automatically changing the setting multiple times and take multiple images. Each of the multiple images is sometimes referred to as a bracket. Multiple images generated by exposure bracketing can be used to create HDR images.

During HDR image creation, ghosting artifacts can appear when object have moved, appeared or disappeared in between the shooting of the different images (brackets). For example, during the shooting of three brackets, if a person walks into the scene only in the third bracket, then the HDR image created from the three brackets (without ghost removal techniques) will have a semi-transparent figure of the person over the scene ("ghost"). Such objects are referred to as ghost-inducing objects in this disclosure. Various methods are known for identifying such ghost-inducing objects within the multiple images, so that the images can be processed to reduce or eliminate ghosting effects in the resulting HDR image.

SUMMARY

The present invention is directed to an improved method and related apparatus for HDR image generation with reduced artifacts.

An object of the present invention is to reduce chromatic artifacts in under- or over-exposed areas.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a method for generating a high dynamic range (HDR) image from a set of multiple images having different exposure levels, which includes: detecting ghost-inducing objects in the set of multiple images to generate a ghost map for each image, each pixel of the ghost map representing a ghost-weight of a corresponding pixel in the corresponding image; and generating the HDR image using the set of multiple images, the corresponding ghost maps, and a set of corresponding weight functions, wherein each pixel of the HDR image is a weighted sum of contributions from each of the multiple images weighted by a weighting factor, the weighting factor for each pixel of each image being a product of the ghost-weight for the pixel of the image and a weight value for the pixel of the image, the weight value being calculated from the weight function corresponding to the image, wherein each weight function is a function of pixel intensity, and the weight functions for all images are defined over a common pixel intensity range, wherein the weight functions for at least some of the images are different from each other, wherein for a first weight function for a first image, its values in a first region near a higher end of the intensity range are higher than corresponding values in a corresponding second region near a lower end of the intensity range, the first region and the second region being symmetrical to each other with respect to a midpoint of the intensity range, and wherein for a second weight function for a second image having a higher exposure level than the first image, its values in a first region near the lower end of the intensity range are higher than corresponding values in a corresponding second region near the higher end of the intensity range, the first region and the second region being symmetrical to each other with respect to the midpoint of the intensity range.

In another aspect, the present invention provides a computer program product comprising a computer usable non-transitory medium (e.g. memory or storage device) having a computer readable program code embedded therein for controlling a data processing apparatus, the computer readable program code configured to cause the data processing apparatus to execute the above methods.

In another method, the present invention provides a digital camera which includes the computer usable non-transitory medium described above, and further includes an imaging section for obtaining images; a control section for controlling the imaging section to obtain a set of images having different exposure levels.

It is to be understood that both the foregoing general description and the following detailed description are exemplary and explanatory and are intended to provide further explanation of the invention as claimed.

DETAILED DESCRIPTION OF PREFERRED EMBODIMENTS

In high dynamic range (HDR) image creation, the HDR image is generated by fusing (or merging, combining) multiple input images (brackets) together, the multiple brackets having been taken for the same scene at different exposure levels. In a conventional HDR image generation algorithm, the pixel value E(p) for each pixel p of the HDR image is a weighted sum of contributions from the multiple images, calculated using the following combination equation:

$$E(p) = \frac{\sum_i w[I_i(p)] * CRF^{-1}[I_i(p)]/\Delta t_i}{\sum_i w[I_i(p)]} \quad (1)$$

where p is the pixel index, E(p) is the pixel intensity (brightness) of pixel p of the HDR image, i is the bracket index, $I_i(p)$ is the pixel intensity of pixel p of bracket i, $CRF^{-1}(I)$ is the inverse of a camera response function CRF, $\Delta t_i$ is a normalizing constant for bracket i to compensate for the difference in exposure levels of the brackets (for example it can be the exposure time when aperture is fixed, or a value related to the aperture size when exposure time is fixed, or a value related to both when both aperture size and shutter speed change from bracket to bracket), and w[I] is a weight function. The three color channels of the color images are calculated separately.

The pixel value of the HDR image can alternatively be calculated using an equation based on the logarithmic function:

$$\log(E(p)) = \frac{\sum_i w[I_i(p)] * (\log(CRF^{-1}[I_i(p)]) - \log(\Delta t_i))}{\sum_i w[I_i(p)]} \quad (1A)$$

In both Equation (1) and Equation (1A), a function of the pixel of the HDR image E(p) is a weighted sum of contributions from the multiple brackets. In addition to a linear function and a logarithmic function, other functions can be used to express the contribution of the brackets.

Figure 1:
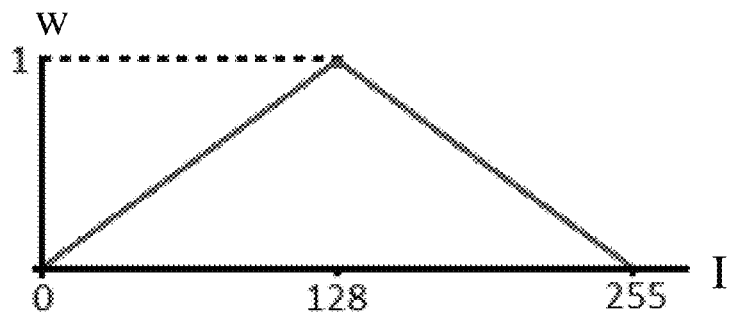
FIG. 1 shows an exemplary weight function for HDR image generation according to a conventional method.

In one conventional algorithm, the weigh function w, as a function of input pixel intensity I over an intensity range, has a triangular shape where the weight w increases linearly from w=0 at the lowest intensity value (e.g. I=0) to w=1 at a midpoint of the intensity range (e.g. I=127 and I=128, or I=127.5), then decreases linearly from that point to w=0 at the highest intensity value (e.g. I=255). In this disclosure, higher pixel intensity corresponds to brighter pixels. This is only a matter of convention. FIG. 1 schematically illustrates the weight function used in the conventional algorithm. This weight function has the effect that better exposed pixels (those having pixel values closer to the midpoint of the intensity range) contribute more to the HDR image than relatively poorly exposed pixels (those having pixel values closer to the lower or upper end of the intensity range).

When ghost artifact removal is incorporated, the pixel value E(p) of the HDR image is calculated using the following combination equation:

$$E(p) = \frac{\sum_i w[I_i(p)] * g_i(p) * CRF^{-1}[I_i(p)]/\Delta t_i}{\sum_i w[I_i(p)] * g_i(p)} \quad (2)$$

where $g_i(p)$ is the ghost-weight value of pixel p of bracket i. In other words, for each pixel p, the weighting factor for each bracket i is the product of the ghost-weight $g_i(p)$ and the weight value $w[I_i(p)]$. An alternative equation using the logarithmic scale based on Equation (1A) can be similarly obtained.

The ghost-weight value varies between 0 and 1 (or more generally, between 0 and a predetermined constant) inclusive, where g=0 indicates a fully ghost pixel and g=1 indicates a fully non-ghost pixel. Typically, pixels located inside or outside a ghost-inducing object and not near its boundary are considered fully ghost (g=0) and fully non-ghost (g=1), respectively, and pixels located near the boundary of a ghost-inducing object have ghost-weight values between 0 and 1 exclusive. It can be seen that when the ghost-weight value $g_i(p)$ is zero (fully ghost), the corresponding pixel p of bracket i does not contribute to the HDR image. As a result, ghost-inducing objects will not appear in the HDR image and ghost artifacts are avoided. The purpose of assigning ghost-weight values between 0 and 1 for pixels near the boundary of the ghost-inducing object is to prevent visual artifacts in the HDR image such as abrupt color-tone changes at the boundary of the would-be ghosts. In some alternative HDR algorithms, the ghost-weight values have only two discrete values, 0 and 1, for ghost and non-ghost pixels, respectively. This alternative method accomplishes ghost artifact removal although it may leave other artifacts such as that mentioned above.

Note that in some HDR algorithms, the ghost-weight values g are define such that g=1 indicates fully ghost pixels and g=0 indicates fully non-ghost pixels; in such a case, g will be replaced by (1−g) in Equation 2. This is only a matter of convention.

The inventors of the instant application observed that, when the weight function shown in FIG. 1 is used, in some situations, chromatic artifacts may appear when the denominator of Equation 2 becomes very small. As described above, the conventional weight function w is zero when the input pixel intensity I is at the upper and lower end of the intensity range (e.g. I=0 and I=255), i.e., when the pixel is extremely under or over exposed. When Equation 1 is used to calculate E (i.e. without ghost artifact removal), the denominator $\Sigma_i w[I_i(p)]$ is zero only when the weights w for all brackets i are zero, i.e., the same pixel p is over or under exposed in all brackets i. Normally this does not happen frequently. However, compared to Equation 1, when Equation 2 is used in HDR image creation to accomplish ghost artifact removal, the denominator may have a greater tendency to become close to zero because each weight w is multiplied by the ghost-weight g which can be zero or near zero for some brackets. Thus, for example, for a pixel p, if all brackets that do not contain ghost-inducing objects at that pixel are over or under exposed, then the denominator may be near zero, even though some brackets are well exposed. When the denominator is near zero, a slight variation in pixel intensities among the color channels can induce a relatively large difference in the calculated E value, causing chromatic artifacts.

Accordingly, embodiments of the present invention correct this problem by modifying the weight function w from that shown in FIG. 1, and by using different weight functions for different brackets. The modified weight function is denoted $u_i$ (where i is the bracket index) in this disclosure. More specifically, for shorter exposure brackets among the image set (i.e. darker images), the values of the weight function u near the higher end of the pixel intensity range (i.e. brighter pixels) are adjusted upwards to low but non-zero values; and for longer exposure brackets among the image set (i.e. brighter images), the values of the weight function u at the lower end of the pixel intensity range (i.e. darker pixels) are adjusted upwards to low but non-zero values. For the middle brackets, the values of the weight function u for at the two ends of the intensity range (i.e. I=0 and I=255) are adjusted to a low but non-zero value.

The pixel value E(p) of the HDR image is calculated using the following modified combination equation:

$$E(p) = \frac{\sum_i u_i[I_i(p)] * g_i(p) * CRF^{-1}[I_i(p)]/\Delta t_i}{\sum_i u_i[I_i(p)] * g_i(p)} \quad (3)$$

An alternative equation using the logarithmic scale based on Equation (1A) can be similarly obtained. In other words, a function (linear of logarithmic or other function) of each pixel value of the HDR image E(p) is a weighted sum of contributions from the multiple images, where the weighting factor for each contributing bracket is the product of the ghost-weight $g_i(p)$ for that pixel of that bracket and a weight value $w[I_i(p)]$ for that pixel of that bracket which is a function of the pixel intensity.

Figure 2:
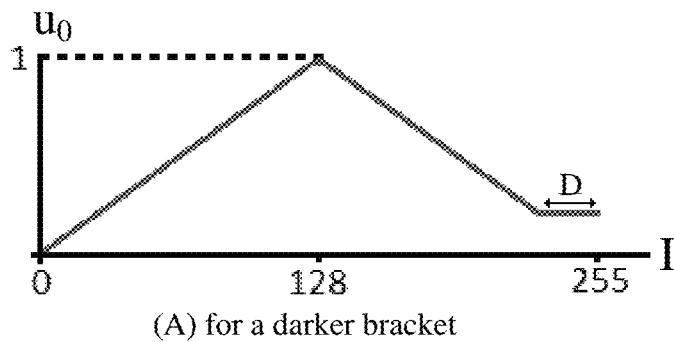
FIG. 2 shows exemplary modified weight functions for HDR image generation according to an embodiment of the present invention.
Figure 2:
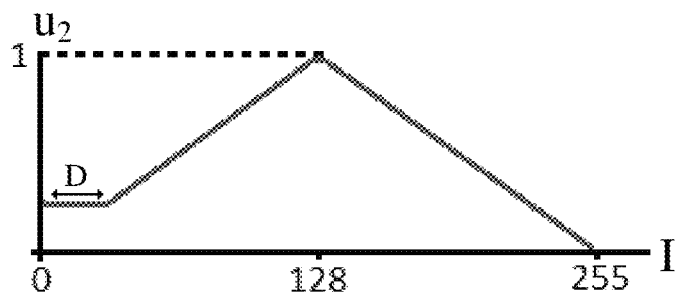

Using an example of a three-bracket image set, an embodiment of the present is described in more detail below. For convenience, darker images are given lower bracket indices in this disclosure, and the three brackets have bracket indices i=0, 1 and 2. FIG. 2, panels A and B show exemplary modified weight functions $u_0$ and $u_2$ for the first (darkest) and third (brightest) brackets, respectively. In this particular example, for the darkest bracket (i=0), the weight function $u_0(I)$ is identical to the conventional weight function w (FIG. 1) except that at in the intensity region between 255–D1 and 255, where D1 is an integer value smaller than 127, the weight function $u_0(I)$ has a constant value equal to $u_0[255-D1]$. For the brightest bracket (i=2), the weight function $u_2(I)$ is identical to the conventional weight function w except that at in the intensity region between 0 and D1, the weight function $u_2(I)$ has a constant value equal to $u_2[D1]$. For the middle bracket (i=1), the weight function $u_2(I)$ is identical to the conventional weight function w except that at both endpoints of the intensity range, the weight values are equal to the weight values for the next intensity value, namely, $u_1[0]$, $u_1[1]$ and $u_1[255]$, $u_1[254]$.

The weight functions can be expressed as:

$$u_0[I] = \begin{cases} \frac{I}{127}, & 0 \le I < 128 \\ \frac{255-I}{127}, & 128 \le I < 255-D1 \\ \frac{D1}{127}, & 255-D1 \le I \le 255 \end{cases} \quad (4A)$$

$$u_1[I] = \begin{cases} \frac{D0}{127}, & 0 \le I < D0 \\ \frac{I}{127}, & D0 \le I < 128 \\ \frac{255-I}{127}, & 128 \le I < 255-D0 \\ \frac{D0}{127}, & 255-D0 \le I \le 255 \end{cases} \quad (4B)$$

$$u_2[I] = \begin{cases} \frac{D1}{127}, & 0 \le I < D1 \\ \frac{I}{127}, & D1 \le I < 128 \\ \frac{255-I}{127}, & 128 \le I \le 255 \end{cases} \quad (4C)$$

In one particular example, D1=16 and D0=1, but other suitable values may be used.

The effect of the modified weight functions $u_i$ is that if a pixel has a very high intensity value in the darkest image, it is not to be discarded or given very low weight as an over-exposed pixel; and if a pixel has a very low intensity value in the brightest image, it is not to be discarded or given very low weight as an under-exposed pixel. These pixels will now have a higher contribution (as compared to the conventional method using the weight function w) to the HDR image. By using the modified weight functions $u_i$, the denominator of Equation 3 is very rarely close to zero.

For an image set having more than three brackets, the darker brackets (i.e. brackets that are darker than the middle bracket for an image set with an odd number of brackets, or the darker half of the brackets for an image set with an even number of brackets) have weight functions similar to Equation 4A but progressively smaller D values for progressively less dark brackets; the brighter brackets have weight functions similar to Equation 4C but progressively smaller D values for progressively less bright brackets. The middle bracket (if any) has a weight function identical to Equation 4B, and the value D0 is smaller than the D values for all other brackets.

The weight functions $u_i$ described in equations (4A) to (4C) and shown in FIG. 2 are merely examples; other suitable weight functions may be used in alternative embodiments of the present invention. For example, in the modified intensity regions, i.e. in the region near the higher (or lower) end for darker (or brighter) brackets, instead of horizontal lines, the weight functions can be a slanted line with lesser slopes than the lines in the middle region, or curved lines. Also, in the illustrated examples, the shape of the weight functions in the middle region is based on the shape of a conventional weight function w (FIG. 1), but other shapes may be used. For example, the shape in the middle region can be a curved line that generally increases toward the midpoint and then generally decreases after that point; it can also have a flat portion near the midpoint. Preferably, the shape of the middle region should be symmetrical with respect to the midpoint of the intensity range.

More generally, in embodiments of the present invention, for an input image set having two or more brackets, the weight functions, which are all defined over the same pixel intensity range, should satisfy the following: First, in a middle range of the pixel intensity range, the weight functions for all brackets should have the same or substantially the same shape. The shape is generally higher closer to the midpoint of the intensity range and decreases toward the two ends of the intensity range. Preferably, the shape is symmetrical with respect to the midpoint of the intensity range.

Second, for each of at least some (preferably, all) of the darker brackets, a first region of the intensity range near the higher end has higher weights than a corresponding second region near the lower end; and for each of at least some (preferably, all) of the brighter brackets, a first region of the intensity range near the lower end have higher weights than a corresponding second region near the higher end. Here, two intensity regions are said to correspond to each other when they are symmetrical to each other with respect to the midpoint of the intensity range. Also, darker (or brighter) brackets are brackets that are darker (or brighter) than the middle bracket for an image set with an odd number of brackets, or the darker (or brighter) half of the brackets for an even number of brackets. Thus, while the lowest intensity point in the darker brackets and the highest intensity point in the brighter brackets may have zero weight, the weights for the highest intensity region of the darker brackets and the lowest intensity region of the brighter brackets are given non-zero weights.

Third, for an image set having four or more brackets, among the at least some of the darker (or brighter) brackets, the length of the first region decreases, and the weight values in those region decrease, progressively from darker (or brighter) to less dark (or less bright) brackets, i.e. as the bracket index increases (or decreases).

Fourth (optional), for the middle bracket of a set of odd number of brackets, or for the middle two brackets of a set of even number of brackets, the weight function in a first region near the lower end of the intensity range and in a corresponding second region near the higher end are symmetrical with respect to the midpoint of the intensity range and have non-zero values.

Figure 3:
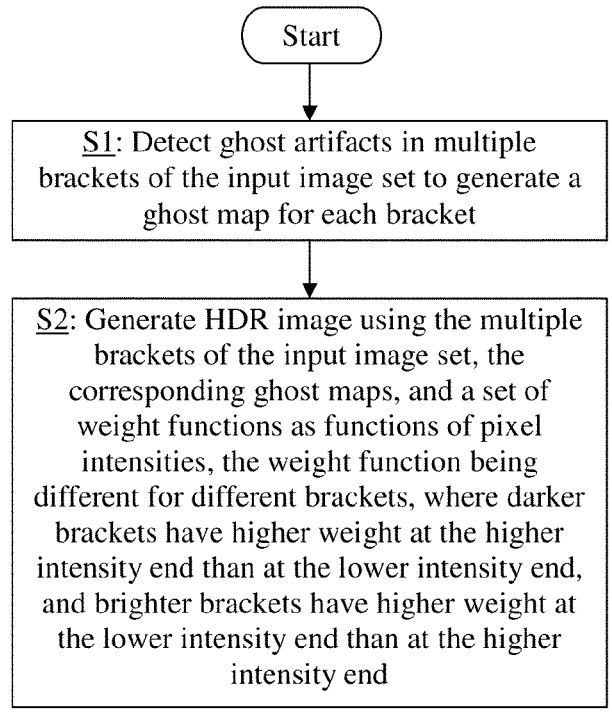
FIG. 3 schematically illustrates a method for HDR image creation according to an embodiment of the present invention.

The process of HDR image generation includes, as shown in FIG. 3, includes a step of detecting ghost artifacts in the multiple brackets of the input image set to generate a ghost map for each bracket (step Si) and a step of generating an HDR image using the multiple brackets, the corresponding ghost maps, and a set of weight functions as functions of pixel intensities, the weight function being different for different brackets and having properties described above.

Figures 4A, 4B:
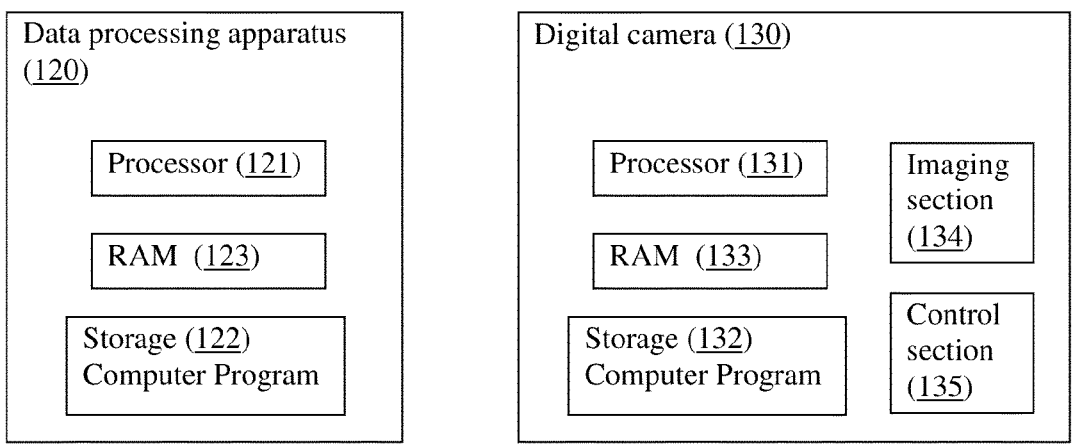
FIGS. 4A and 4B schematically illustrate a data processing apparatus and a camera, respectively, in which embodiments of the present invention may be implemented.

The ghost artifact removal methods described here can be implemented in a data processing system such as a computer 120 as shown in FIG. 4A. The computer 120 comprises a processor 121, a storage device (e.g. hard disk drive) 122, and an internal memory (e.g. a RAM) 123. The storage device 122 stores software programs, which are read out to the RAM 123 and executed by the processor 121 to carry out the methods.

The method may also be implemented in hardwired circuits, such as one or more chips within a digital camera. FIG. 4B schematically illustrates a digital camera 130, which includes a processor 121, a storage device 132, and an internal memory 133, as well as an imaging section 134 for obtaining images and a control section 135 for controlling the various functions of the camera. The control section 135 may perform autobracketing to automatically take a set of images at different exposure levels. Autobracketing is well known and its details are omitted here. The processor 131 may process the set of images using the algorithm described above to generate an HDR image.

In one aspect, the invention is embodied in a data processing apparatus, which may be the data processing section of a digital camera. In another aspect, the invention is a computer program product embodied in computer usable non-transitory medium having a computer readable program code embedded therein for controlling a data processing apparatus. In another aspect, the invention is a method carried out by a data processing apparatus.

It will be apparent to those skilled in the art that various modification and variations can be made in the ghost artifact detection and removal method and related apparatus of the present invention without departing from the spirit or scope of the invention. Thus, it is intended that the present invention cover modifications and variations that come within the scope of the appended claims and their equivalents.

What is claimed is:

1. A method for generating a high dynamic range (HDR) image from a set of multiple images having different exposure levels, comprising:

detecting ghost-inducing objects in the set of multiple images to generate a ghost map for each image, each pixel of the ghost map representing a ghost-weight of a corresponding pixel in the corresponding image; and generating the HDR image using the set of multiple images, the corresponding ghost maps, and a set of corresponding weight functions, wherein each pixel of the HDR image is a weighted sum of contributions from each of the multiple images weighted by a weighting factor, the weighting factor for each pixel of each image being a product of the ghost-weight for the pixel of the image and a weight value for the pixel of the image, the weight value being calculated from the weight function corresponding to the image, wherein each weight function is a function of pixel intensity, and the weight functions for all images are defined over a common pixel intensity range, wherein the weight functions for at least some of the images are different from each other, wherein for a first weight function for a first image, its values in a first region near a higher end of the intensity range are higher than corresponding values in a corresponding second region near a lower end of the intensity range, the first region and the second region being symmetrical to each other with respect to a midpoint of the intensity range, and wherein for a second weight function for a second image having a higher exposure level than the first image, its values in a first region near the lower end of the intensity range are higher than corresponding values in a corresponding second region near the higher end of the intensity range, the first region and the second region being symmetrical to each other with respect to the midpoint of the intensity range.

2. The method of claim 1, where the HDR image is generated using to an equation defined as:

$$E(p) = \frac{\sum_i u_i[I_i(p)] * g_i(p) * CRF^{-1}[I_i(p)]/\Delta t_i}{\sum_i u_i[I_i(p)] * g_i(p)}$$

where p is a pixel index, E(p) is a pixel intensity of pixel p of the HDR image, i is a bracket index for each image, $I_i(p)$ is a pixel intensity of pixel p of image i, the value of I being and $CRF^{-1}(I)$ is an inverse of a camera response function, $\Delta t_i$ is a normalizing constant related to the exposure level for image i, $g_i(p)$ is a pixel value of the ghost map for image i at pixel p, and $u_i[I]$ is a weight function for image i.

3. The method of claim 1, wherein the first intensity range of the first weight function and the first intensity range of the second weight function are symmetrical to each other with respect to the midpoint of the intensity range.

4. The method of claim 1, wherein the first weight function has a constant value in its first region, and the second weight function has a constant value in its first region.

5. The method of claim 1, wherein for a third image having an exposure level greater than that of the first image and less than that of the second image, the weight function has symmetrical shapes in a first region near the lower end of the intensity range and a second region near the higher end, the first and second regions being symmetrical with respect to the midpoint of the intensity range, and wherein the weight function is non-zero in the first and second regions.

6. The method of claim 1, wherein the weight functions for all images are substantially identical within a middle region of the intensity range, the weight functions increasing with intensity for intensities lower than the midpoint of the intensity range and decreasing with intensity for intensities higher than the midpoint.

7. A computer program product comprising a computer usable non-transitory medium having a computer readable program code embedded therein for controlling a data processing apparatus, the computer readable program code configured to cause the data processing apparatus to execute a process for generating a high dynamic range (HDR) image from a set of multiple images having different exposure levels, the process comprising:
  detecting ghost-inducing objects in the set of multiple images to generate a ghost map for each image, each pixel of the ghost map representing a ghost-weight of a corresponding pixel in the corresponding image; and
  generating the HDR image using the set of multiple images, the corresponding ghost maps, and a set of corresponding weight functions, wherein each pixel of the HDR image is a weighted sum of contributions from each of the multiple images weighted by a weighting factor, the weighting factor for each pixel of each image being a product of the ghost-weight for the pixel of the image and a weight value for the pixel of the image, the weight value being calculated from the weight function corresponding to the image,
  wherein each weight function is a function of pixel intensity, and the weight functions for all images are defined over a common pixel intensity range,
  wherein the weight functions for at least some of the images are different from each other,
  wherein for a first weight function for a first image, its values in a first region near a higher end of the intensity range are higher than corresponding values in a corresponding second region near a lower end of the intensity range, the first region and the second region being symmetrical to each other with respect to a midpoint of the intensity range, and
  wherein for a second weight function for a second image having a higher exposure level than the first image, its values in a first region near the lower end of the intensity range are higher than corresponding values in a corresponding second region near the higher end of the intensity range, the first region and the second region being symmetrical to each other with respect to the midpoint of the intensity range.

8. The computer program product of claim 7, where the HDR image is generated using to an equation defined as:

$$E(p) = \frac{\sum_i u_i[I_i(p)] * g_i(p) * CRF^{-1}[I_i(p)]/\Delta t_i}{\sum_i u_i[I_i(p)] * g_i(p)}$$

where p is a pixel index, E(p) is a pixel intensity of pixel p of the HDR image, i is a bracket index for each image, $I_i(p)$ is a pixel intensity of pixel p of image i, the value of I being and $CRF^{-1}(I)$ is an inverse of a camera response function, $\Delta t_i$ is a normalizing constant related to the exposure level for image i, $g_i(p)$ is a pixel value of the ghost map for image i at pixel p, and $u_i[I]$ is a weight function for image i.

9. The computer program product of claim 7, wherein the first intensity range of the first weight function and the first intensity range of the second weight function are symmetrical to each other with respect to the midpoint of the intensity range.

10. The computer program product of claim 7, wherein the first weight function has a constant value in its first region, and the second weight function has a constant value in its first region.

11. The computer program product of claim 7, wherein for a third image having an exposure level greater than that of the first image and less than that of the second image, the weight function has symmetrical shapes in a first region near the lower end of the intensity range and a second region near the higher end, the first and second regions being symmetrical with respect to the midpoint of the intensity range, and wherein the weight function is non-zero in the first and second regions.

12. The computer program product of claim 7, wherein the weight functions for all images are substantially identical within a middle region of the intensity range, the weight functions increasing with intensity for intensities lower than the midpoint of the intensity range and decreasing with intensity for intensities higher than the midpoint.

13. A digital camera comprising the computer usable non-transitory medium of claim 6, the digital camera further comprising:
  an imaging section for obtaining images; and
  a control section for controlling the imaging section to obtain the set of images having different exposure levels.

* * * * *